US012777379B2

(12) United States Patent
Elmali et al.

(10) Patent No.: US 12,777,379 B2
(45) Date of Patent: Oct. 27, 2026

(54) SUCCESSFUL PRIMARY SECONDARY CELL CHANGES

(71) Applicant: Nokia Technologies Oy, Espoo (FI)

(72) Inventors: Ugur Baran Elmali, Munich (DE); Irina-Mihaela Balan, Munich (DE); Guillaume Decarreau, Munich (DE); Ahmad Awada, Munich (DE); Bernhard Wegmann, Munich (DE)

(73) Assignee: Nokia Technologies Oy, Espoo (FI)

( * ) Notice: Subject to any disclaimer, the term of this patent is extended or adjusted under 35 U.S.C. 154(b) by 312 days.

(21) Appl. No.: 18/471,722

(22) Filed: Sep. 21, 2023

(65) Prior Publication Data

US 2024/0163743 A1 May 16, 2024

(30) Foreign Application Priority Data

Nov. 11, 2022 (GB) ...................................... 2216851

(51) Int. Cl.
*H04W 36/00* (2009.01)

(52) U.S. Cl.
CPC .................. *H04W 36/0061* (2013.01); *H04W 36/008375* (2023.05)

(58) Field of Classification Search
CPC . H04W 36/0061; H04W 24/10; H04W 24/02; H04W 36/0083; H04W 76/00
See application file for complete search history.

(56) References Cited

U.S. PATENT DOCUMENTS

2024/0049074 A1* 2/2024 Krishnan .............. H04W 36/08
2024/0205763 A1* 6/2024 Yan ....................... H04W 36/08

FOREIGN PATENT DOCUMENTS

EP 4018722 A1 6/2022
WO 2021/066515 A1 4/2021
WO 2021/150014 A1 7/2021
WO 2022/121889 A1 6/2022
WO 2022/147776 A1 7/2022
WO 2022/217467 A1 10/2022
WO WO-2024035304 A1 * 2/2024 ............ H04W 24/02

(Continued)

OTHER PUBLICATIONS

"3rd Generation Partnership Project; Technical Specification Group Radio Access Network; NR; NR and NG-RAN Overall Description; Stage 2 (Release 17)", 3GPP TS 38.300, V17.2.0, Sep. 2022, pp. 1-210.

(Continued)

*Primary Examiner* — Marisol Figueroa
(74) *Attorney, Agent, or Firm* — McCarter & English, LLP

(57) ABSTRACT

Embodiments of the present disclosure relate to devices, methods, apparatuses and computer readable storage media of enabling a successful Mobility Robustness Optimization analysis for primary secondary cell (PSCell) changes. The method comprises transmitting, from a terminal device to a master node of the terminal device, information related to a node initiating a successful PSCell change for the terminal device, wherein the information is indicative of at least one of the following: whether the node initiating the successful PSCell change is either a master node or a secondary node for the apparatus; a cell identifier of the node initiating the successful PSCell change.

19 Claims, 5 Drawing Sheets

(56) References Cited

FOREIGN PATENT DOCUMENTS

WO WO-2024035305 A1 * 2/2024 .......... H04W 36/362

OTHER PUBLICATIONS

"3rd Generation Partnership Project; Technical Specification Group Radio Access Network; Evolved Universal Terrestrial Radio Access (E-UTRA) and NR; Multi-connectivity; Stage 2 (Release 17)", 3GPP TS 37.340, V17.2.0, Sep. 2022, pp. 1-112.
"3rd Generation Partnership Project; Technical Specification Group Radio Access Network; NG-RAN; Xn application protocol (XnAP) (Release 17)", 3GPP TS 38.423, V17.2.0, Sep. 2022, pp. 1-614.
"3rd Generation Partnership Project; Technical Specification Group Radio Access Network; NR; Radio Resource Control (RRC) protocol specification (Release 17)", 3GPP TS 38.331, V17.2.0, Sep. 2022, pp. 1-1298.
"Revised WID on enhancement of data collection for SON/MDT in NR and EN-DC", 3GPP TSG RAN meeting #88-e, RP-201281, Agenda: 9.10.14, CMCC, Jun. 26-Jul. 3, 2020, 5 pages.
"Revised WID: Further enhancement of data collection for SON (Self-Organising Networks)/MDT (Minimization of Drive) Tests) in NR standalone and MR-DC (Multi-Radio Dual Connectivity)", 3GPP TSG RAN meeting #96, RP-221825, Agenda: 9.3.3.1, CMCC, Jun. 6-9, 2022, 7 pages.
"Discussion of SON on MR-DC CPAC", 3GPP TSG-RAN WG2 #119bis electronic, R2-2209726, Agenda: 8.13.8, OPPO, Aug. 2022, 4 pages.
"Msc-generator", Sourceforge, Retrieved on Oct. 4, 2023, Webpage available at : https://sourceforge.net/projects/msc-generator/.
"SON enhancements for successful PSCell change report", 3GPP TSG-RAN WG2 Meeting #119bis-e, R2-2209957, Agenda: 8.13.4, Lenovo, Oct. 10-19, 2022, 2 pages.
"IEEE 802.11", Wikipedia, Retrieved on Oct. 3, 2023, Webpage available at : https://en.wikipedia.org/wiki/IEEE_802.11.
Search Report received for corresponding United Kingdom Patent Application No. 2216851.2, dated May 18, 2023, 2 pages.
"Discussion on SON enhancement for SHR and SPR", 3GPP TSG-RAN WG3 #118-e, R3-226278, Agenda: 10.2.1, CATT, Nov. 14-18, 2022, pp. 1-5.
Office Action received for corresponding United Kingdom Patent Application No. 2216851.2, dated Sep. 5, 2024, 3 pages.
Extended European Search Report received for corresponding European Patent Application No. 23202871.2, dated Mar. 26, 2024, 12 pages.
"[SON BL CRs, TP to TS 38.423, TP to TS 36.423] HO delay and non-up-to-date SCG UHI information", 3GPP TSG-RAN WG3 Meeting #114-e, R3-214811, Agenda item: 10.2.1.4, Nokia, Nov. 1-11, 2021, 90 pages.
"Summary of Offline Discussion on MRO for SN Change", 3GPP TSG-RAN WG3 #109-e, R3-205661, Agenda Item: 10.2.1.6, Nokia, Aug. 17-27, 2020, 11 pages.

* cited by examiner

SUCCESSFUL PRIMARY SECONDARY CELL CHANGES

RELATED APPLICATION

This application claims priority from, and the benefit of, GB Application No.: 2216851.2 filed on Nov. 11, 2022, which is hereby incorporated by reference in its entirety.

FIELD

Embodiments of the present disclosure generally relate to the field of telecommunication and in particular to devices, methods, apparatuses and computer readable storage media of successful primary secondary cell (PSCell) changes.

BACKGROUND

The 3rd Generation Partnership Project (3GPP) has specified data collection enhancements in New Radio (NR) for Self-organizing Networks (SON)/Minimization of Drive Tests (MDT), which may refer to the support of data collection for SON features, involving coverage and capacity optimization, inter-system inter-RAT energy saving, inter-system load balancing, 2-step Random Access Channel (RACH) optimization, mobility enhancement optimization, and Physical Cell Identification (PCI) selection, successful handover reports, history information in E-UTRA NR Dual connectivity (EN-DC) of User Equipment (UE), load balancing enhancement, RACH optimization and Mobility Robustness Optimization (MRO) for secondary node (SN) change failure.

SUMMARY

In general, example embodiments of the present disclosure provide a solution of enabling a successful MRO analysis for PSCell changes.

In a first aspect, there is provided an apparatus. The apparatus comprises at least one processor; and at least one memory storing instructions that, when executed by the at least one processor, cause the apparatus at least to transmit, to a master node of the apparatus, information related to a node initiating a successful PSCell change for the apparatus, wherein the information is indicative of at least one of the following: whether the node initiating the successful PSCell change is either a master node or a secondary node for the apparatus; a cell identifier (ID) of the node initiating the successful PSCell change.

In a second aspect, there is provided an apparatus. The apparatus comprises at least one processor; and at least one memory storing instructions that, when executed by the at least one processor, cause the apparatus at least to obtain information related to a node initiating a successful PSCell change for a terminal device, wherein the information is indicative of at least one of the following: whether the node initiating the successful PSCell change is either a master node or a secondary node for the terminal device; a cell ID of the node initiating the successful PSCell change.

In a third aspect, there is provided an apparatus. The apparatus comprises at least one processor; and at least one memory storing instructions that, when executed by the at least one processor, cause the apparatus at least to transmit, to a master node of a terminal device, information related to a node initiating a successful PSCell change for the terminal device, wherein the information is indicative of at least one of the following: whether the node initiating the successful PSCell change is either a master node or a secondary node for the terminal device; a cell ID of the node initiating the successful PSCell change.

In a fourth aspect, there is provide a method. The method comprises transmitting, by a terminal device and to a master node of the terminal device, information related to a node initiating a successful PSCell change for the terminal device, wherein the information is indicative of at least one of the following: whether the node initiating the successful PSCell change is either a master node or a secondary node for the terminal device; a cell ID of the node initiating the successful PSCell change.

In a fifth aspect, there is provide a method. The method comprises obtaining, by a master node of a terminal device, information related to a node initiating a successful PSCell change for the terminal device, wherein the information is indicative of at least one of the following: whether the node initiating the successful PSCell change is either a master node or a secondary node for the terminal device; a cell ID of the node initiating the successful PSCell change.

In a sixth aspect, there is provided a method. The method comprises transmitting, by a secondary node of a terminal device and to a master node of the terminal device, information related to a node initiating a successful PSCell change for the terminal device, wherein the information is indicative of at least one of the following: whether the node initiating the successful PSCell change is either a master node or a secondary node for the terminal device; a cell ID of the node initiating the successful PSCell change.

In a seventh aspect, there is provided an apparatus comprising means for transmitting, to a master node of the apparatus, information related to a node initiating a successful PSCell change for the apparatus, wherein the information is indicative of at least one of the following: whether the node initiating the successful PSCell change is either a master node or a secondary node for the apparatus; a cell identifier (ID) for the node initiating the successful PSCell change.

In an eighth aspect, there is provided an apparatus comprising means for obtaining information related to a node initiating a successful PSCell change for a terminal device, wherein the information is indicative of at least one of the following: whether the node initiating the successful PSCell change is either a master node or a secondary node for the terminal device; a cell ID of the node initiating the successful PSCell change.

In a ninth aspect, there is provided an apparatus comprising means for transmitting, to a master node of a terminal device, information related to a node initiating a successful PSCell change for the terminal device, wherein the information is indicative of at least one of the following: whether the node initiating the successful PSCell change is either a master node or a secondary node for the terminal device; a cell ID of the node initiating the successful PSCell change.

In a tenth aspect, there is provided a non-transitory computer readable medium. The non-transitory computer readable medium comprising program instructions that, when executed by an apparatus, cause the apparatus to perform at least the method according to the fourth aspect, the fifth aspect or the sixth aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings.

Throughout the drawings, the same or similar reference numerals may represent the same or similar element.

DETAILED DESCRIPTION

Figure 1:
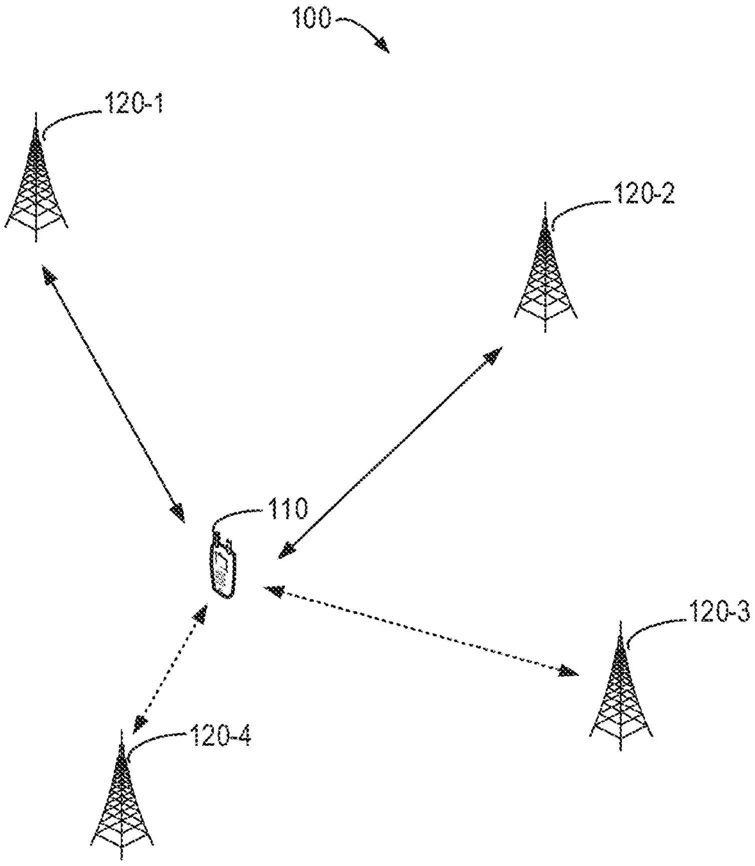
FIG. 1 illustrates an example environment in which example embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first," "second" and the like may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used herein, unless stated explicitly, performing a step "in response to A" does not indicate that the step is performed immediately after "A" occurs and one or more intervening steps may be included.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying 5 software and/or firmware. The term circuitry also covers, for example and if applicable to the particular claim element, a baseband integrated circuit or processor integrated circuit for a mobile device or a similar integrated circuit in server, a cellular network node, or other computing or network node.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network node" refers to a node in a communication network via which a terminal device accesses the network and receives services therefrom. The network node may refer to a base station (BS) or an access point (AP), for example, a node B (NodeB or NB), an evolved NodeB (eNodeB or eNB), an NR NB (also referred to as a gNB), a Remote Radio Unit (RRU), a radio header (RH), a remote radio head (RRH), a relay, an Integrated Access and Backhaul (IAB) node, a low power node such as a femto, a pico, a non-terrestrial network (NTN) or non-ground network node such as a satellite network node, a low earth orbit (LEO) satellite and a geosynchronous earth orbit (GEO) satellite, an aircraft network node, and so forth, depending on the applied terminology and technology. In some example embodiments, radio access network (RAN) split architecture includes a Centralized Unit (CU) and a Distributed Unit (DU) at an IAB donor node. An IAB node includes a Mobile Terminal (IAB-MT) part that behaves like a UE toward the parent node, and a DU part of an IAB node behaves like a base station toward the next-hop IAB node.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to a Mobile Termination (MT) part of an IAB node (e.g., a relay node). In the following description, the terms "terminal device", "communication device", "terminal", "user equipment" and "UE" may be used interchangeably.

As used herein, the term "resource," "transmission resource," "resource block," "physical resource block" (PRB), "uplink resource," or "downlink resource" may refer to any resource for performing a communication, for example, a communication between a terminal device and a network node, such as a resource in time domain, a resource in frequency domain, a resource in space domain, a resource in code domain, or any other resource enabling a communication, and the like. In the following, unless explicitly stated, a resource in both frequency domain and time domain will be used as an example of a transmission resource for describing some example embodiments of the present disclosure. It is noted that example embodiments of the present disclosure are equally applicable to other resources in other domains.

FIG. 1 shows an example communication network 100 in which embodiments of the present disclosure may be implemented. As shown in FIG. 1, the communication network 100 may comprise a terminal device 110, which may also be referred to as a UE.

The communication network 100 may further comprise multiple network nodes namely a network node 120-1, a network node 120-2, a network node 120-3 and a network node 120-4. For example, the network node 120-1 may act as a Master Node (MN) serving the terminal device 110, while the network node 120-2 may act as a Secondary Node (SN). In some scenarios, for example, in a dual connectivity scenario, both the MN and the SN may serve the terminal device 110.

For example, the network node 120-2 may serve the terminal device 110 as the SN currently. If a primary secondary cell (PSCell) change procedure for the terminal device 110 is triggered, for example, the network node 120-3 may serve the terminal device 110 as a SN and a network node 120-4 may serve the terminal device 110 as a MN after the PSCell change is successful. In this situation, the network node 120-2 may also be referred to a source SN node in the PSCell change procedure and the network node 120-3 may also be referred to a target SN node in the PSCell change procedure.

It is to be understood that the number of network nodes and terminal devices shown in FIG. 1 is given for the purpose of illustration without suggesting any limitations. The communication network 100 may include any suitable number of network nodes and terminal devices.

Hereinafter the network node 120-1 may also be referred to as a first MN and the network node 120-4 may also be referred to as a second MN, while the network node 120-2 may also be referred to as a first SN and the network node 120-3 may also be referred to as a second SN.

The network nodes 120-1, 120-2, 120-3 and 120-4 may also be referred as a network node 120 collectively. In some example embodiments, links from the network node 120 to the terminal device 110 may be referred to as a downlink (DL), while links from the terminal device 110 to the network node 120 may be referred to as an uplink (UL). In DL, the network node 120 is a transmitting (TX) device (or a transmitter) and the terminal device 110 is a receiving (RX) device (or receiver). In UL, the terminal device 110 is a TX device (or transmitter) and the network node 120 is a RX device (or a receiver).

Communications in the communication environment 100 may be implemented according to any proper communication protocol(s), includes, but not limited to, cellular communication protocols of the first generation (1G), the second generation (2G), the third generation (3G), the fourth generation (4G), the fifth generation (5G), the sixth generation (6G), and the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, includes but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

During a handover (HO) from a cell to another, although the HO may be successful, still there may be outages during the HO. For example, a T310 timer may start but may not expire before HO complete. In this situation, it may be possible to further optimize the timing of the handovers and therefore successful handover report (SHR) is introduced.

The SHR may be configured by both a source and a target node (configuring different parts of SHR) during handover. Different parts of SHR may be configured by different nodes and the SHR configuration may be within a handover command. The SHR may be fetched by the target node and forwarded back to the source node, if needed, using UEInformationRequest/UEInformationResponse. The UE may include the availability of SHR to the network in each complete message sent in RRC procedure, such as RRCReconfigurationComplete, RRCReestablishmentComplete, RRCSetupComplete, RRCResumeComplete message if it has available successful HO report to be reported. The UE may discard the SHR, i.e., release the UE variable VarSuccHO-Report, 48 hours after the SHR is stored.

For example, the UE may only log the SHR if the configuration of the SHR is received during the HO and at least one of the following criteria may be satisfied, for example, a T310 timer of the UE exceeds the configured threshold by the source node, a T312 timer of the UE exceeds the configured threshold by the source node, or a T304 timer of the UE exceeds the configured threshold by the target node. It is to be understood that separate thresholds may be configured for the above-mentioned timers, i.e., the T310 timer, the T304 timer or the T312 timer. For example, the thresholds may be percentage values of 40%, 60%, 80%. The percentage is to indicate the ratio of the threshold value (unit:ms) over the signalled T310/T312/T304 value (unit: ms). For threshold for T312, the percentage value may also include 20%.

For example, the content of SHR may include source and target cell IDs of the HO, location information, latest radio link measurements of all measurement IDs available at the time HO is executed for all HO types, a cause that was the trigger for generating the SHR, i.e., t310-cause, t312-cause, t304-cause, latest radio measurement results of the candidate target cells in case of conditional HO, a time elapsed between conditional HO execution towards target cell and corresponding latest configuration received for the selected target cell, a Cell-Radio Network Temporary Identifier (C-RNTI) of target cell or RA-InformationCommon when T304 is above a threshold.

In case of a Multi-RAT Dual Connectivity (MR-DC), a MN may function as a controlling entity that provides control plane connection to the core network and utilize an SN for additional resources to the UE. The Secondary Cell Group (SCG) may refer to a group of serving cells associated with the SN and comprise a PSCell, which is the primary cell of the SCG.

Moreover, both MN and SN may be responsible for SCG mobility, that is, both MN-initiated SN change and SN-initiated SN change with/without MN involvement are possible. In addition, the SN may change the PSCell of the UE without notifying the MN (intra-SN PSCell change without MN involvement) using the dedicated signalling radio bearer between SN and the UE, in case of EN-DC, eNB NR Dual Connectivity (NGEN-DC) and NR-DC. In that case, the MN is not aware of the PSCell change, although it still knows the correct SN that the UE is connected to.

The study on successful PSCell change report, i.e., SPCR, is expected to be further developed based on the features and frameworks for SON/MDT. For example, the content of the SPCR may need to be further enhanced. Furthermore, the content of Mobility History Information (MHI) and/or SCG User History Information (SCG UHI) are also expected to be enhanced.

As described above, both MN and SN may be responsible for triggering the PSCell changes of the UE. Thus, both MN and SN may be able to configure SPCR in order to optimize their own PSCell change decisions by collecting statistics for MRO. In both cases, i.e., a MN or a SN initiated PSCell change, the MN may be the node retrieving the SPCR first and forwarding it to the source/target SN, if needed.

In a case where the UE context has not been deleted at the MN (i.e., the SPCR is retrieved by the MN that the UE was connected to while making PSCell chang, which may also be referred to as an original MN (for example, the network node 120-1 as shown in FIG. 1), the original MN may know which node initiated the last PSCell change.

However, in a case where the UE context has already been deleted at the original MN when the original MN receives the SPCR report (i.e., report is retrieved at another MN and forwarded to the original MN) or in a case the original MN does not keep track which node initiated the PSCell change, the original MN may be unable to determine which node had initiated the PSCell change.

It is to be understood that such report associated with which node had initiated the PSCell change may be kept at least 48 hours at the UE and may be retrieved by the network at any time. For example, due to congestion the original MN may not retrieve it before handing the UE over to another node.

Therefore, in such a scenario, the SPCR may not be used by the node that had initiated the PSCell change, even if the original MN receives the SPCR from the MN that fetched the report from the UE, the original MN would not be able to make use of it due to lack of information who initiated the PSCell change that led to the creation of SPCR, i.e., whether it is the original MN or some SN.

First of all, if the original MN may be unable to determine which node had initiated the PSCell change, the MRO may be unsuccessful. Moreover, it is not clear how the MN that fetches the SPCR from the UE would determine which MN was the "original MN" that was serving the UE during the corresponding PSCell change.

It is to be expected that the original MN to be able to determine which node had initiated the successful PSCell change, even though the information on this was already deleted.

According to some example embodiments of the present disclosure, there is provided a solution for a successful MRO analysis for PSCell changes. In this solution, the MN obtains, from a terminal device or from a SN, information related to a node initiating a successful PSCell change for the terminal device, which may comprise at least one of whether the node initiating the PSCell is either a MN of the terminal device or a SN of the terminal device; or a cell ID of the node initiating a successful PSCell change.

Example embodiments of the present disclosure will be described in detail below with reference to the accompanying drawings.

Figure 2:
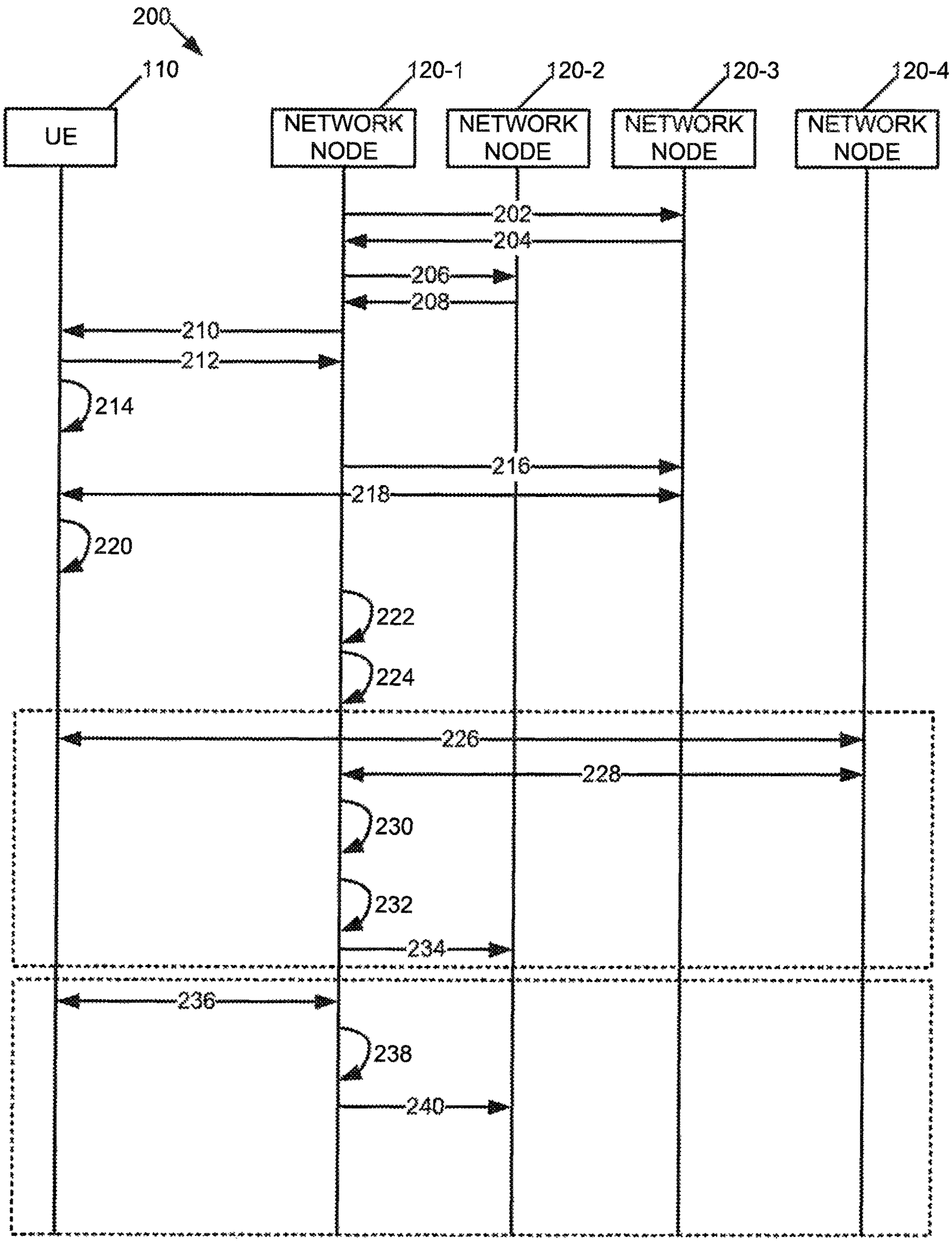
FIG. 2 shows a signaling chart illustrating a process of enabling a successful MRO analysis for PSCell changes according to some example embodiments of the present disclosure.

Reference is now made to FIG. 2, which shows a signaling chart 200 for communication according to some example embodiments of the present disclosure. As shown in FIG. 2, the signaling chart 200 involves the terminal device 110, the network node 120-1, the network node 120-2, the network node 120-3 and the network node 120-4. For the purpose of discussion, reference is made to FIG. 1 to describe the signaling chart 200. In the case shown in FIG. 2, the network node 120-1 and the network node 120-4 may act as MNs, the network node 120-2 and the network node 120-3 may act SNs. In some scenarios, the network node 120-2 may act as a source SN and the network node 120-3 may act as a target SN. In some other scenarios, the network node 120-3 may act as a source SN and the network node 120-4 may act a target SN.

As shown in FIG. 2, the terminal device 110 is connected to the cell associated with network node 120-1 (e.g., an original MN) and a PSCell associated with the network node 120-2 (e.g., a source SN in the PSCell change).

If the network node 120-1 determines that a PSCell change from the PSCell associated with the network node 120-2 to a PSCell associated with the network node 120-3 (e.g., the target SN in the PSCell change) to be initiated, e.g., based on measurements reported by the terminal device 110, a procedure for adding the network node 120-3 and releasing the network node 120-2 is performed.

For example, the network node 120-1 may transmit 202 an SN addition request to the network node 120-3. Then the network node 120-3 may response 204 a SN addition request ACK to the network node 120-1. Then the network node 120-1 may transmit 206 an SN release request to the network node 120-2. Then the network node 120-2 may response 208 an SN release request ACK to the network node 120-1.

Then the network node 120-1 may transmit 210 a RRCReconfiguration to the terminal device 110 in which the initiating node information may be included. For example, the initiating node information may indicate which node had initiated the PSCell change. Then the terminal device 110 then may response 212 a RRCReconfiguration Complete message to the network node 120-1.

In some example embodiments, at least based on the initiating node information, the terminal device 110 may generate 214 the MHI. That is, the MHI may indicate which node had initiated the PSCell change. For example, the MHI may indicate that corresponding PSCell change was initiated by the network node 120-1. It is to be understood that the MHI may also be referred, in some scenarios, to the UHI of the terminal device.

The network node 120-1 may transmit 216 an SN reconfiguration complete message to the network node 120-3. Then the terminal device 110 may initiate 218 a random access procedure to the network node 120-3.

At the terminal device 110, a SPCR may be generated 220. In some example embodiments, the terminal device 110 may generate the SPCR including the initiating node information. That is, the SPCR may indicate that which node had initiated the PSCell change. As another option, the SPCR may also include a cell ID of a primary cell of the terminal device 110.

Then network node 120-1 may decide 222 to handover the terminal device 110 to network node 120-4 based on reported measurements received from the terminal device.

After the handover completes, i.e., the handover from the network node 120-1 to the network node 120-4 has been completed, the network node 120-1 may release 224 the context of the terminal device 110. That is, the network node 120-1 would not know which node had initiate the PSCell change.

Then a MN (e.g., a retrieving MN) who managing the network node 120-4 may retrieve the SPCR from the terminal device 110. It is also possible that the retrieving MN may also retrieve the MHI from the terminal device.

In some scenario, if the MN retrieving the SPCR and/or the MHI is the network node 120-4, which is different from the original MN (e.g., the network node 120-1), the network node 120-4 may transmit 226, to the terminal device, a request of the SPCR and/or the MHI retrieving. Upon receiving the retrieved SPCR and/or the MHI, the network node 120-4 may, based on the SPCR and/or the MHI, be aware of the node who had initiated the PSCell change of the terminal device 110.

Then the network node 120-4 may forward 228 the SPCR and/or the MHI, in which the PScell change initiating node information is included, to the original MN (e.g., the network node 120-1).

Based on the received SPCR and/or MHI, the network node 120-1 may understand 230 which node had initiated the PSCell change of the terminal device 110. For example, if the network node 120-1 determines that the network node 120-1 itself had initiated the PSCell change, the network node 120-1 may perform 232 the MRO analysis. For example, it is also possible that the network node 120-1 may learn, from the received SPCR and/or MHI, that a SN (e.g., the network node 120-2) had initiated the PSCell change, the network node 120-1 forward 234 the received SPCR and/or MHI to the SN who had initiated the PSCell change.

In some other scenario, if the MN retrieving the SPCR and/or the MHI is the network node 120-1, i.e., the original MN and the retrieving MN are the same one, the network node 120-1 may transmit 236, to the terminal device, a request of the SPCR and/or the MHI retrieving. Upon receiving the retrieved SPCR and/or the MHI, the network node 120-1 may, based on the SPCR and/or the MHI, be aware of the node who had initiated the PSCell change of the terminal device 110.

Then similarly, if the network node 120-1 determines that the network node 120-1 itself had initiated the PSCell change, the network node 120-1 may perform 238 the MRO analysis. For example, it is also possible that the network node 120-1 may learn, from the received SPCR and/or MHI, that a SN (e.g., the network node 120-2) had initiated the PSCell change, the network node 120-1 forward 240 the received SPCR and/or MHI to the SN who had initiated the PSCell change.

In some embodiments described with reference to FIG. 2, the information related to the node who had initiated the PSCell change is transmitted from the terminal device to a MN. That is, the terminal device 110 enhances the SPCR and/or MHI with the PSCell change initiating node information. In some other embodiments, the information related to the node who had initiated the PSCell change may also be transmitted from a SN to a MN.

Figure 3:
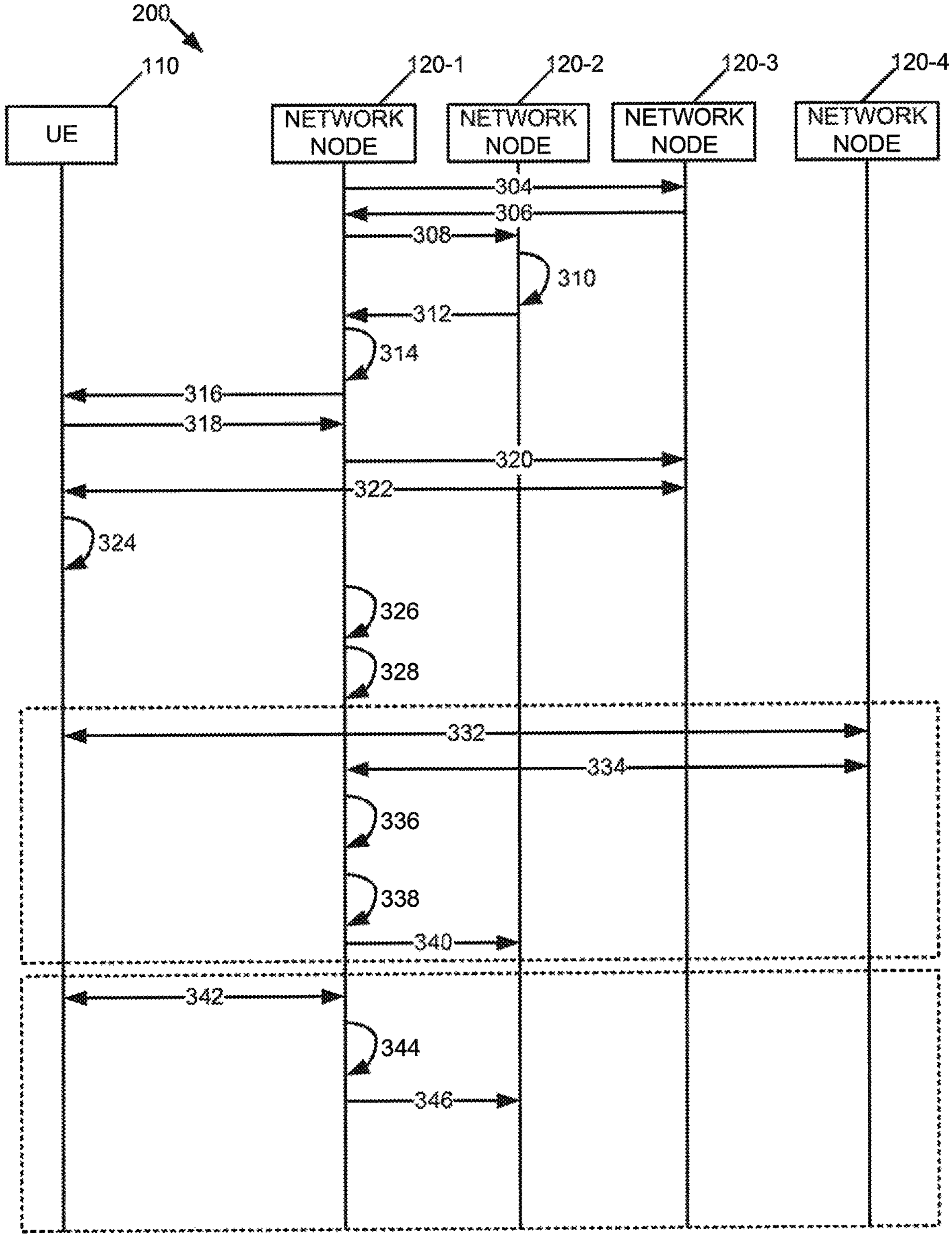
FIG. 3 shows a signaling chart illustrating a process of enabling a successful MRO analysis for PSCell changes according to some example embodiments of the present disclosure.

Reference is now made to FIG. 3, which shows a signaling chart 300 for communication according to some example embodiments of the present disclosure. the signaling chart 300 involves the terminal device 110, the network node 120-1, the network node 120-2, the network node 120-3 and the network node 120-4. For the purpose of discussion, reference is made to FIG. 1 to describe the signaling chart 300. In the case shown in FIG. 2, the network node 120-1 and the network node 120-4 may act as MNs, the network node 120-2 and the network node 120-3 may act SNs. In some scenarios, the network node 120-2 may act as a source SN and the network node 120-3 may act as a target SN. In some other scenarios, the network node 120-3 may act as a source SN and the network node 120-4 may act a target SN.

As shown in FIG. 3, the terminal device 110 is connected to the cell associated with network node 120-1 (e.g., an original MN) and a PSCell associated with the network node 120-2 (e.g., a source SN in the PSCell change).

If the network node 120-1 determines that a PSCell change from the PSCell associated with the network node 120-2 to a PSCell associated with the network node 120-3 (e.g., the target SN in the PSCell change) to be initiated, e.g., based on measurements reported by the terminal device 110, a procedure for adding the network node 120-3 and releasing the network node 120-2 is performed.

For example, the network node 120-1 may transmit 304 an SN addition request to the network node 120-3. Then the network node 120-3 may response 306 a SN addition request ACK to the network node 120-1. Then the network node 120-1 may transmit 308 an SN release request to the network node 120-2.

After receiving the SN release request from the network node 120-1, the network node 120-2 may generate 310 SCG UHI indicating the node that had initiated the PSCell change of the terminal device 110. That is, the SCG UHI has been enhanced by adding the PSCell change initiating node information.

Then the network node 120-2 may response 312 an SN release request ACK along with the enhanced SCG UHI to the network node 120-1. After receiving the SN release request ACK, the network device 120-1 may update 314 its UHI based on the received SCG UHI. Then the UHI of the network node 120-1 may include the initiating node information.

Then the network node 120-1 may transmit 316 a RRCReconfiguration to the terminal device 110 Then the terminal device 110 then may response 318 a RRCReconfiguration Complete message to the network node 120-1.

The network node 120-1 may transmit 320 an SN reconfiguration complete message to the network node 120-3. Then the terminal device 110 may initiate 322 a random access procedure to the network node 120-3.

At the terminal device 110, a SPCR may be generated 324. Then network node 120-1 may decide 326 to handover the terminal device 110 to network node 120-4 based on reported measurements received from the terminal device. During the handover, the UHI of the network node 120-1 may be transferred from the terminal device 110 to a MN who managing the network node 120-4 (e.g., a retrieving MN).

After the handover completes, i.e., the handover from the network node 120-1 to the network node 120-4 has been completed, the network node 120-1 may release 328 the context of the terminal device 110. That is, the network node 120-1 would not know which node had initiate the PSCell change.

Then a MN (e.g., a retrieving MN) may retrieve the SPCR from the terminal device 110.

In some scenario, if the MN retrieving the SPCR is the network node 120-4, which is different from the original MN (e.g., the network node 120-1), the network node 120-4 may transmit 332, to the terminal device, a request of the SPCR retrieving. Upon receiving the retrieved SPCR, the network node 120-4 may, based on the SPCR and/or the UHI (received from the terminal device during the handover), be aware of the node who had initiated the PSCell change of the terminal device 110.

Then the network node 120-4 may forward 334 the SPCR and/or the UHI, in which the PScell change initiating node information is included, to the original MN (e.g., the network node 120-1).

Based on the received SPCR, the network node 120-1 may understand 336 which node had initiated the PSCell change of the terminal device 110. For example, if the network node 120-1 determines that the network node 120-1 itself had initiated the PSCell change, the network node 120-1 may perform 338 the MRO analysis. For example, it is also possible that the network node 120-1 may learn, from the received SPCR and/or UHI, that a SN (e.g., the network node 120-2) had initiated the PSCell change, the network node 120-1 forward 340 the received SPCR to the SN who had initiated the PSCell change.

In some other scenario, if the MN retrieving the SPCR is the network node 120-1, i.e., the original MN and the retrieving MN are the same one, the network node 120-1 may transmit 342, to the terminal device, a request of the SPCR retrieving. Upon receiving the retrieved SPCR, the network node 120-1 may, based on the SPCR and/or the UHI ((received from the terminal device during the handover), be aware of the node who had initiated the PSCell change of the terminal device 110.

Then similarly, if the network node 120-1 determines that the network node 120-1 itself had initiated the PSCell change, the network node 120-1 may perform 344 the MRO analysis. For example, it is also possible that the network node 120-1 may learn, from the received SPCR and/or UHI, that a SN (e.g., the network node 120-2) had initiated the PSCell change, the network node 120-1 forward 346 the received SPCR and/or UHI to the SN who had initiated the PSCell change.

Based on the solution of the embodiments in the present disclosure, the original MN would be able to determine who had initiated the PSCell change that led to the SPCR creation, and either perform MRO itself in case MN is the node that initiated the PSCell change or forward the SPCR to the SN that had initiated the corresponding PSCell change.

Figure 4:
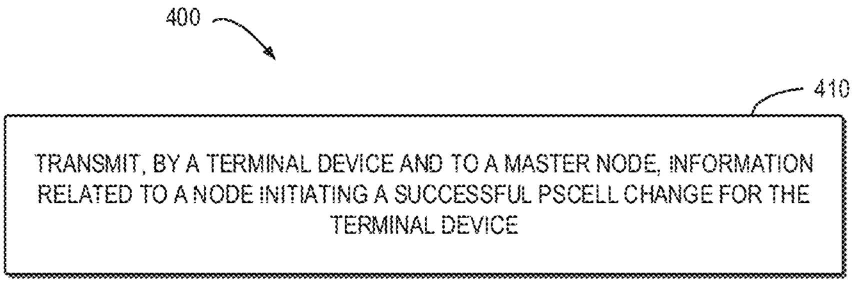
FIG. 4 shows a flowchart of a method implemented at a terminal device according to some example embodiments of the present disclosure.

FIG. 4 shows a flowchart of an example method 400 of enabling a successful MRO analysis for PSCell changes according to some example embodiments of the present disclosure. The method 400 may be implemented at the terminal device 110 as shown in FIG. 1. For the purpose of discussion, the method 400 will be described with reference to FIG. 1.

At block 410, the terminal device transmits, to a master node of the terminal device, information related to a node initiating a successful PSCell change for a terminal device, wherein the information is indicative of at least one of the following: whether the node initiating the successful PSCell change is either a master node or a secondary node for the terminal device; a cell ID of the node initiating the successful PSCell change.

In some example embodiments, the information further indicates a cell ID of a primary cell of the terminal device.

In some example embodiments, the information is included in at least one of a SPCR from the terminal device or MHI from the terminal device.

In some example embodiments, the terminal device may receive, from the master node, a request for retrieving at least one of the SPCR or the MHI; and transmit the information to the master node, in response to the request.

Figure 5:
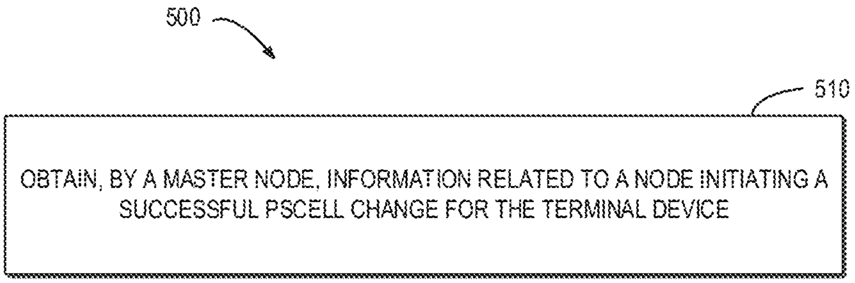
FIG. 5 shows a flowchart of a method implemented at a master node according to some example embodiments of the present disclosure.

FIG. 5 shows a flowchart of an example method 500 of enabling a successful MRO analysis for PSCell changes according to some example embodiments of the present disclosure. The method 500 may be implemented at the network node 120-1 or the network node 120-4 as shown in FIG. 1. For the purpose of discussion, the method 500 will be described with reference to FIG. 1.

At block 510, the network node obtains information related to a node initiating a successful PSCell change for a terminal device, wherein the information is indicative of at least one of the following: whether the node initiating the successful PSCell change is either a master node or a secondary node for the terminal device; a cell ID of the node initiating the successful PSCell change.

In some example embodiments, the network node may obtain the information from the terminal device or a secondary node of the terminal device.

In some example embodiments, the network node may transmit, to the terminal device, a request for retrieving at least one of the SPCR or the MHI.

In some example embodiments, the network node may transmit the information to a master node of the terminal device.

In some example embodiments, the network node may obtain the information from a master node of the terminal device.

In some example embodiments, the network node may determine, based on the information, the node initiating the successful PSCell change.

In some example embodiments, the network node may determine that the information indicates the node initiating the successful PSCell change is a master node of the terminal device; and perform a mobility robustness optimization for the terminal device, based on the determining.

In some example embodiments, the network node may determine that the information indicates the node initiating the successful PSCell change is a secondary node of the terminal device; and transmit the information to the node initiating the successful PSCell change, based on the determining.

In some example embodiments, the information is included in at least one of a SPCR or MHI, or UHI.

In some example embodiments, the information further indicates a cell ID of a primary cell of the terminal device.

Figure 6:
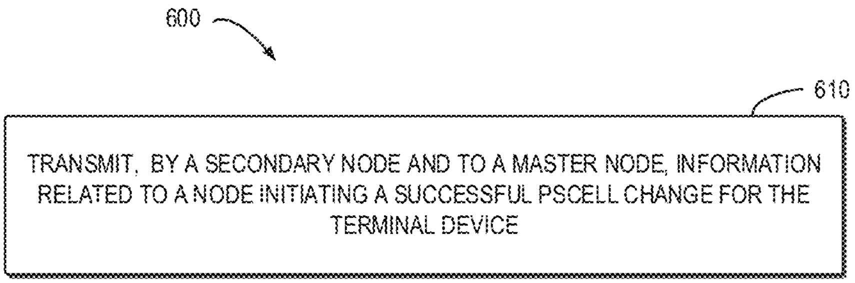
FIG. 6 shows a flowchart of a method implemented at a secondary node according to some example embodiments of the present disclosure.

FIG. 6 shows a flowchart of an example method 600 of enabling a successful MRO analysis for PSCell changes according to some example embodiments of the present disclosure. The method 600 may be implemented at the network node 120-2 or the network node 120-3 as shown in FIG. 1. For the purpose of discussion, the method 600 will be described with reference to FIG. 1.

At block 610, the network node transmits, to a master node of the terminal device, information related to a node initiating a successful PSCell change for a terminal device, wherein the information is indicative of at least one of the following: whether the node initiating the successful PSCell change is either a master node or a secondary node for the terminal device; a cell ID of the node initiating the successful PSCell change.

In some example embodiments, the information is included in SCG UHI from the network node.

In some example embodiments, an apparatus capable of performing the method 400 (for example, implemented at the terminal device 110) may include means for performing the respective steps of the method 400. The means may be implemented in any suitable form. For example, the means may be implemented in a circuitry or software module.

In some example embodiments, the apparatus comprises means for transmitting, to a master node of the apparatus, information related to a node initiating a successful PSCell change for the apparatus, wherein the information is indicative of at least one of the following: whether the node initiating the successful PSCell change is either a master node or a secondary node for the apparatus; a cell identifier (ID) for the node initiating the successful PSCell change.

In some example embodiments, an apparatus capable of performing the method 500 (for example, implemented at the network node 120-1 or 120-4 may include means for performing the respective steps of the method 500. The means may be implemented in any suitable form. For example, the means may be implemented in a circuitry or software module.

In some example embodiments, the apparatus comprises means for obtaining information related to a node initiating a successful PSCell change for a terminal device, wherein the information is indicative of at least one of the following: whether the node initiating the successful PSCell change is either a master node or a secondary node for the terminal device; a cell ID of the node initiating the successful PSCell change.

In some example embodiments, an apparatus capable of performing the method 600 (for example, implemented at the network node 120-2 or 120-3) may include means for performing the respective steps of the method 600. The means may be implemented in any suitable form. For example, the means may be implemented in a circuitry or software module.

In some example embodiments, the apparatus comprises means for transmitting, to a master node of the terminal device, information related to a node initiating a successful PSCell change for a terminal device, wherein the information is indicative of at least one of the following: whether the node initiating the successful PSCell change is either a master node or a secondary node for the terminal device; a cell ID of the node initiating the successful PSCell change.

Figure 7:
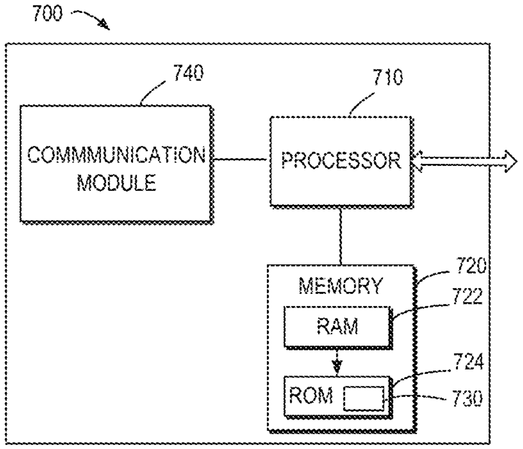
FIG. 7 shows a simplified block diagram of a device that is suitable for implementing example embodiments of the present disclosure.
Figure 8:
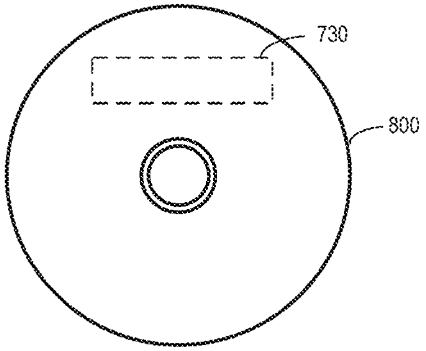
FIG. 8 shows a block diagram of an example computer readable medium in accordance with some embodiments of the present disclosure.

FIG. 7 is a simplified block diagram of a device 700 that is suitable for implementing example embodiments of the present disclosure. The device 700 may be provided to implement a communication device, for example, the network node 120-1, or 120-2, or 120-3 or 120-4 as shown in FIG. 1. As shown, the device 700 includes one or more processors 710, one or more memories 720 coupled to the processor 710, and one or more communication modules 740 coupled to the processor 710.

The communication module 740 is for bidirectional communications. The communication module 740 has one or more communication interfaces to facilitate communication with one or more other modules or devices. The communication interfaces may represent any interface that is necessary for communication with other network elements. In some example embodiments, the communication module 740 may include at least one antenna.

The processor 710 may be of any type suitable to the local technical network and may include one or more of the following: general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may include one or more non-volatile memories and one or more volatile memories. Examples of the non-volatile memories include, but are not limited to, a Read Only Memory (ROM) 724, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 722 and other volatile memories that will not last in the power-down duration.

A computer program 730 includes computer executable instructions that are executed by the associated processor 710. The instructions of the program 730 may include instructions for performing operations/acts of some example embodiments of the present disclosure. The program 730 may be stored in the memory, e.g., the ROM 724. The processor 710 may perform any suitable actions and processing by loading the program 730 into the RAM 722.

The example embodiments of the present disclosure may be implemented by means of the program 730 so that the device 700 may perform any process of the disclosure as discussed with reference to FIG. 2 to FIG. 6. The example embodiments of the present disclosure may also be implemented by hardware or by a combination of software and hardware.

In some example embodiments, the program 730 may be tangibly contained in a computer readable medium which may be included in the device 700 (such as in the memory 720) or other storage devices that are accessible by the device 700. The device 700 may load the program 730 from the computer readable medium to the RAM 722 for execution. In some example embodiments, the computer readable medium may include any types of non-transitory storage medium, such as ROM, EPROM, a flash memory, a hard disk, CD, DVD, and the like. The term "non-transitory," as used herein, is a limitation of the medium itself (i.e., tangible, not a signal) as opposed to a limitation on data storage persistency (e.g., RAM vs. ROM).

FIG. 7 shows an example of the computer readable medium 700 which may be in form of CD, DVD or other optical storage disk. The computer readable medium 800 has the program 730 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

Some example embodiments of the present disclosure also provide at least one computer program product tangibly stored on a computer readable medium, such as a non-transitory computer readable medium. The computer program product includes computer-executable instructions, such as those included in program modules, being executed in a device on a target physical or virtual processor, to carry out any of the methods as described above. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. The program code may be provided to a processor or controller of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Unless explicitly stated, certain features that are described in the context of separate embodiments may also be implemented in combination in a single embodiment. Conversely, unless explicitly stated, various features that are described in the context of a single embodiment may also be implemented in a plurality of embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. An apparatus comprising:

at least one processor; and at least one memory storing instructions that, when executed by the at least one processor, cause the apparatus at least to perform:

receiving, from a terminal device, a successful primary secondary cell (PSCell) change report comprising information related to a node initiating a successful PSCell change for the terminal device, wherein the information is indicative of the following:

whether the node initiating the successful PSCell change is either a master node or a secondary node that was serving the terminal device prior to the successful PSCell change; and a cell identifier (ID) of the node initiating the successful PSCell change; and determining which node should perform a mobility robustness optimization for the terminal device at least by determining which node initiated the successful PSCell change.

2. The apparatus of claim 1, wherein the at least one memory stores instructions that, when executed by the at least one processor, cause the apparatus at least to: obtain the information from the secondary node of the terminal device.

3. The apparatus of claim 1, wherein the master node is an original master node, and wherein the at least one memory stores instructions that, when executed by the at least one processor, cause the apparatus at least to: obtain the information from an other master node of the terminal device that became the master node after handover of the terminal device from the original master node to the other master node.

4. The apparatus of claim 1, wherein the at least one memory stores instructions that, when executed by the at least one processor, cause the apparatus at least to perform:

determining that the information indicates the node initiating the successful PSCell change is the master node of the terminal device; and performing a mobility robustness optimization for the terminal device, based at least on the information.

5. The apparatus of claim 1, wherein the at least one memory stores instructions that, when executed by the at least one processor, cause the apparatus at least to performing:

determining that the information indicates the node initiating the successful PSCell change is a secondary node of the terminal device; and transmitting the information to the node initiating the successful PSCell change.

6. The apparatus of claim 1, wherein the information further indicates a cell ID of a primary cell of the terminal device.

7. The apparatus of claim 1, wherein the apparatus comprises a master node of the terminal device.

8. A method comprising:

receiving, from a terminal device, a successful primary secondary cell (PSCell) change report comprising information related to a node initiating a successful PSCell change for the terminal device, wherein the information is indicative of the following:

whether the node initiating the successful PSCell change is either a master node or a secondary node that was serving the terminal device prior to the successful PSCell change; and a cell identifier (ID) of the node initiating the successful PSCell change; and determining which node should perform a mobility robustness optimization for the terminal device at least by determining which node initiated the successful PSCell change.

9. The method of claim 8, wherein obtaining the information comprises: obtaining the information from the secondary node of the terminal device.

10. The method of claim 8, wherein obtaining the information comprises: obtain the information from an other master node of the terminal device that became the master node after handover of the terminal device from an original master node to the other master node.

11. The method of claim 8, further comprising:

determining that the information indicates the node initiating the successful PSCell change is the master node of the terminal device; and performing a mobility robustness optimization for the terminal device, based at least on the information.

12. The method of claim 8, further comprising:

determining that the information indicates the node initiating the successful PSCell change is a secondary node of the terminal device; and transmitting the information to the node initiating the successful PSCell change.

13. The method of claim 8, wherein the information further indicates a cell ID of a primary cell of the terminal device.

14. The apparatus of claim 1, wherein:

the apparatus is a first node that performs the receiving and the determining, and the first node is connected to the terminal device;

the information is indicative of the following:

the node initiating the successful PSCell change is the master node that was serving the terminal device prior to the successful PSCell change; or and the cell ID of the master node initiating the successful PSCell change;

the determining comprises determining the node which should perform the mobility robustness optimization for the terminal device is the master node that was serving the terminal device prior to the successful PSCell change, wherein the first node is different from the node that initiated the successful PSCell change; and sending, from the first node to the node that initiated the successful PSCell change, the information from the successful PSCell change report.

15. A terminal device comprising:

at least one processor; and at least one memory storing instructions that, when executed by the at least one processor, cause the terminal device at least to perform:

participating in a successful primary secondary cell (PSCell) change; and sending a successful primary secondary cell (PSCell) change report comprising information related to a node initiating the successful PSCell change for the terminal device, wherein the information is indicative of the following:

whether the node initiating the successful PSCell change is either a master node or a secondary node that was serving the terminal device prior to the successful PSCell change; and a cell identifier (ID) of the node initiating the successful PSCell change.

16. The terminal device of claim 15, wherein the information is indicative of at least one of the following:

the node initiating the successful PSCell change is the master node that was serving the terminal device prior to the successful PSCell change; or the cell ID of the master node initiating the successful PSCell change.

17. The terminal device of claim 15, wherein the information is indicative of at least one of the following:

the node initiating the successful PSCell change is the secondary node that was serving the terminal device prior to the successful PSCell change; or the cell ID of the secondary node initiating the successful PSCell change.

18. The terminal device of claim 15, wherein the information further indicates a cell ID of a primary cell of the terminal device.

19. The terminal device of claim 15, wherein the at least one memory stores instructions that, when executed by the at least one processor, causes the terminal device at least to perform:

receiving, from the master node, a request for retrieving at least one of successful primary secondary cell change report (SPCR) or mobility history information (MHI); and transmitting the information to the master node, in response to the request.

* * * * *